(12) United States Patent
Hara

(10) Patent No.: US 8,928,927 B2
(45) Date of Patent: Jan. 6, 2015

(54) IMAGE FORMING APPARATUS THAT BUFFERS DATA IN A STORAGE DEVICE AND REDUCES DELAYS IN PROCESS

(71) Applicant: KYOCERA Document Solutions Inc., Osaka (JP)

(72) Inventor: Hiroyuki Hara, Osaka (JP)

(73) Assignee: KYOCERA Document Solutions Inc. (JP)

(*) Notice: Subject to any disclaimer, the term of this patent is extended or adjusted under 35 U.S.C. 154(b) by 0 days.

(21) Appl. No.: 14/251,976

(22) Filed: Apr. 14, 2014

(65) Prior Publication Data
US 2014/0218774 A1  Aug. 7, 2014

Related U.S. Application Data

(62) Division of application No. 13/434,440, filed on Mar. 29, 2012, now Pat. No. 8,736,889.

(30) Foreign Application Priority Data

Mar. 30, 2011 (JP) ................................. 2011-076879

(51) Int. Cl.
*G06K 15/00* (2006.01)
*H04N 1/00* (2006.01)
*G06K 15/02* (2006.01)
*H04N 1/21* (2006.01)

(52) U.S. Cl.
CPC .......... *H04N 1/0083* (2013.01); *G06K 15/1851* (2013.01); *H04N 1/21* (2013.01)

USPC ........ 358/1.17; 358/1.16; 358/1.15; 711/110; 711/115

(58) Field of Classification Search
CPC ... G06K 15/1851; G06K 15/22; G06K 15/02; G06K 2215/0065; H04N 1/32561; H04N 1/32587
USPC ................ 358/1.15, 1.16, 1.17; 711/100, 115
See application file for complete search history.

(56) References Cited

U.S. PATENT DOCUMENTS

2006/0007467 A1* 1/2006 Tsunekawa .................. 358/1.13
2011/0225378 A1* 9/2011 Hara ............................. 711/155

FOREIGN PATENT DOCUMENTS

JP  2007-179496 A  7/2007

* cited by examiner

*Primary Examiner* — Jacky X Zheng
(74) *Attorney, Agent, or Firm* — McDonnell Boehnen Hulbert & Berghoff LLP

(57) ABSTRACT

An image forming apparatus includes a processor, and a storage controller that writes band data to a storage device and reads the band data. The processor: (a) generates a write-side process and a read-side process; (b) generates a write-side thread by the write-side process; (c) generates a read-side thread and a file read thread by the read-side process; (d) notifies the read-side process of an identifier within the storage device, and causes the storage controller to sequentially write the band data; and (e) requests the file read thread to cause the storage controller to sequentially read out the band data corresponding to the identifier and causes the storage controller to sequentially read out the band data and one or more subsequent band data.

4 Claims, 20 Drawing Sheets

IMAGE FORMING APPARATUS THAT BUFFERS DATA IN A STORAGE DEVICE AND REDUCES DELAYS IN PROCESS

CROSS-REFERENCE TO RELATED APPLICATION AND INCORPORATION BY REFERENCE

This divisional patent application claims priority to U.S. patent application Ser. No. 13/434,440 filed on Mar. 29, 2012, and is based upon, and claims the benefit of priority from, corresponding Japanese Patent Application No. 2011-076879, filed in the Japan Patent Office on Mar. 30, 2011, the entire contents of which are incorporated herein by reference.

BACKGROUND

1. Field

The present invention relates to an image forming apparatus that buffers data in a storage device.

2. Description of the Related Art

A typical image forming apparatus such as a copier or a multifunction peripheral (MFP) includes a data processing device that performs various types of image processing. To buffer image data, the data processing device stores the image data for one page in a file within a storage device such as a hard disk drive (HDD). In some embodiments, the image data may be stored using a write-side program (for example, an image processing program). Further, the data processing device may provide a read-side program with a file identifier corresponding to a given file. Then, the read-side program may use the file identifier to locate the file and read out the image data.

In addition, there is technology for providing a first-in first-out (FIFO) buffer when data is written to the HDD, in which the data is written to the FIFO buffer in one thread and is written from the FIFO buffer to the HDD in another thread.

As described above, data is generally read out using predetermined units in the storage device, such as a page in a document. As such, writing and reading of the data are sequentially performed. Further, before the writing of the predetermined unit of data is completed, the data cannot be read out, which may cause a delay in process associated with the buffering of such data.

SUMMARY

The present disclosure relates to an image forming apparatus capable of reducing a delay in processing. In some embodiments, the delay may be associated with the buffering of data in a storage device and the image forming device may reduce the delay associated with the buffering.

According to one aspect of the present disclosure, an image forming apparatus may include: a storage controller configured to: (i) write image data on one page to a storage device, wherein the image data comprises a plurality of pieces of band data and (ii) read out the plurality of pieces of band data from the storage device; and a processor configured to control the storage controller. The processor is configured to: (a) generate a write-side process that causes the storage controller to write the plurality of pieces of band data (b) generate a read-side process that causes the storage controller to read out the plurality of pieces of band data; (c) generate a write-side thread by the write-side process; (d) generate a read-side thread and a file read thread by the read-side process; (e) based on the write-side process, notify the read-side process of an identifier of a storage area within the storage device, (f) based on the write-side thread, cause the storage controller to sequentially write the plurality of pieces of band data; (g) based on the read-side process and the read-side thread, request the file read thread to cause the storage controller to sequentially read out the plurality of pieces of band data from the identifier of the from the storage area; and (h) based on the file read thread, cause the storage controller to sequentially read out the plurality of pieces of band data, where based on a request for reading of one of the plurality of pieces of band data, the file read thread is configured to cause the storage controller to read out the one of the plurality of pieces of band data. One or more of the plurality of pieces of band data is subsequent to the one of the plurality of pieces of band data.

According to another aspect of the present disclosure, an image forming apparatus may include: a storage controller configured to: (i) write image data on one page to a storage device, wherein the image data comprises a plurality of pieces of band data, and (ii) read out the plurality of pieces of band data from the storage device; and a processor configured to control the storage controller. The processor is configured to: (a) generate a write-side process that causes the storage controller to write the plurality of pieces of band data; (b) generate a read-side process that causes the storage controller to read out the plurality of pieces of band data; (c) generate a write-side thread and a file write thread by the write-side process; (d) generate a read-side thread and a file read thread by the read-side process; (e) based on the write-side process, cause the write-side thread to notify the read-side thread of an identifier of a storage area within the storage device, then sequentially queue, with the write-side thread, write requests for each of the plurality of pieces of band data in a queue system; (f) based on the file write thread, cause the storage controller to write the plurality of pieces of band data in order of the queued write requests; (g) based on the read-side process and the read-side thread, sequentially queue read requests for each of the plurality of pieces of band data in the queue system when the identifier is received; and (h) based on the file read thread, cause the storage controller to read the plurality of pieces of band data in order of the queued read requests. Based on reading of one of the plurality of pieces of band data, the file read thread is configured to cause the storage controller to read out the one of the plurality of pieces of band data, where one or more of the plurality of pieces of band data that is subsequent to the one of the plurality of pieces of band data.

According to yet another aspect of the present disclosure, an image forming apparatus may include: a storage controller configured to: (i) write image data on one page to a storage device, wherein the image data comprises a plurality of pieces of band data and (ii) to read out the plurality of pieces of band data from the storage device; and a processor configured to control the storage controller. The processor is configured to: (a) generate a write-side process that causes the storage controller to write the plurality of pieces of band data; (b) generate a read-side process that causes the storage controller to read out the plurality of pieces of band data; (c) generate a write-side thread and a file write thread by the write-side process; (d) generate a read-side thread and a file read thread by the read-side process; (e) based on the write-side process, store one piece of band data in a memory; (f) based on the write-side thread, generate an event at each time a write request for one piece of band data is queued in a queue system; (g) based on the read-side process and the read-side thread, delete each of the plurality of pieces of band data from the memory when writing of the each of the plurality of pieces of band data to the storage device is completed; (h) based on sequentially performing queued read requests for the plurality of pieces of band data, if one of the plurality of pieces of band data to be read out exists on the memory, cause the storage controller to read out the one of the plurality of pieces of band data, and if none of the plurality of pieces of band data exists on the memory, cause the storage controller to read out each of the plurality of pieces of band data from the storage device; and (i) based on reading of one of the plurality of pieces of band data requested by the read-side thread, cause the storage controller to read out the one of the plurality of pieces of band data, and where one or more of the plurality of pieces of band data is subsequent to the one of the plurality of pieces of band data.

Additional features and advantages are described herein, and which will be apparent from the following detailed description and the figures.

DETAILED DESCRIPTION

First Embodiment

Figure 1:
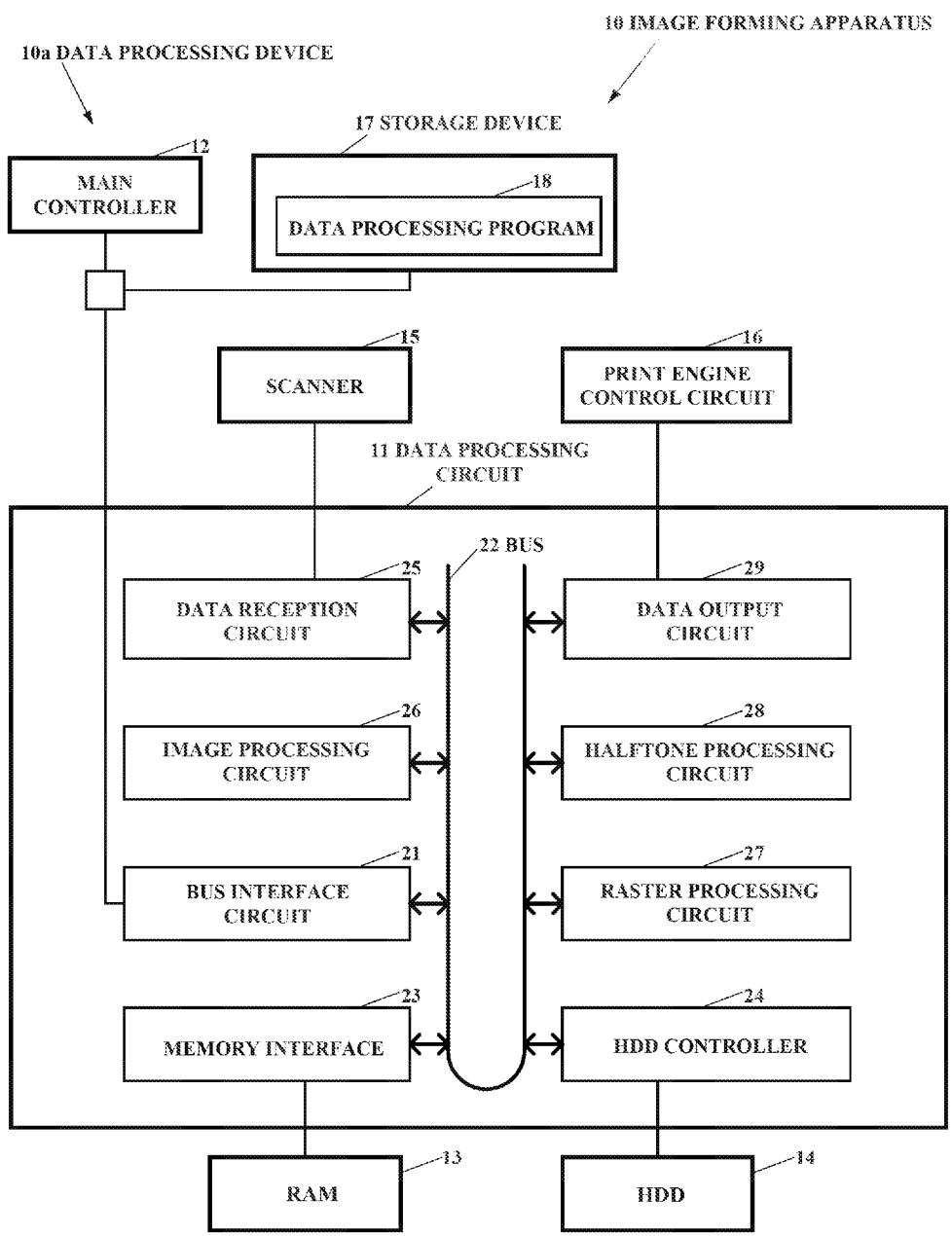
FIG. 1 shows a block diagram illustrating a configuration of an image forming apparatus according to a first embodiment of the present disclosure.

FIG. 1 shows a block diagram illustrating a configuration of an image forming apparatus 10 according to a first embodiment of the present disclosure.

In some embodiments, the image forming apparatus 10 may include a data processing circuit 11, a main controller 12, a random access memory (RAM) 13, a hard disk drive (HDD) 14, a scanner 15, a print engine control circuit 16, a storage device 17, and/or a print engine (not illustrated) that performs printing on paper. Further, in some instances, the data processing circuit 11, the main controller 12, the RAM 13, the HDD 14, and the storage device 17, among other possible parts and/or subparts that may provide for a data processing device 10a.

In some embodiments, the data processing circuit 11 may process image data in units of band or page from the scanner 15 or the like and outputs the image data to the HDD 14 or the print engine control circuit 16.

Further, in some embodiments, the main controller 12 may transfer instructions to respective units within the data processing circuit 11 via a bus interface circuit 21 and a bus 22. The main controller 12 may be a processor such as a central processing unit (CPU), and may output an instruction in accordance with the data processing program 18 stored in the storage device 17.

In addition, in some embodiments, the RAM 13 may be a memory for temporarily storing image data, image processing data, and/or band data, among other possible types data used in processing performed by the data processing circuit 11. For example, the RAM 13 may be a dynamic RAM (DRAM).

In some embodiments, the HDD 14 may be a storage device for temporarily storing a plurality of pieces of band data that constitute the image data on one page.

In some embodiments, the scanner 15 optically may read an image on an original and may output the image data.

In some embodiments, the print engine control circuit 16 may supply print image data to a print engine, and may also control the print engine to perform printing.

In some embodiments, the storage device 17 may be a nonvolatile storage device such as a flash memory, and may store various programs and data used by the main controller 12. However, it should be noted that the storage device 17 may also be a volatile storage device such as RAM, DRAM, SRAM, content addressable memory, and/or dual-ported RAM, among other possibilities. The data processing program 18 is stored in the storage device 17.

In some embodiments, the data processing circuit 11 includes the bus interface circuit 21, the bus 22, a memory interface 23, an HDD controller 24, a data reception circuit 25, an image processing circuit 26, a raster processing circuit 27, a halftone processing circuit 28, and a data output circuit 29. The data processing circuit 11 may be implemented as an application specific integrated circuit (ASIC).

In some embodiments, the bus interface circuit 21 connects the main controller 12 to the bus 22.

In some embodiments, the memory interface 23 may be a circuit that transmits/receives data and/or instructions between the RAM 13 and the bus 22.

In some embodiments, the HDD controller 24 may be a circuit that reads and writes data from/to the HDD 14 in accordance with instructions transferred from the main controller 12, and constitutes a storage controller according to the first embodiment.

In some embodiments, the data reception circuit 25 may sequentially acquire the image data from the scanner 15 as the band data to be stored in the RAM 13 and/or the HDD 14 in accordance with instructions transferred from the main controller 12. The data reception circuit 25 may include a direct memory access (DMA) controller. For example, the band data may be data for 128 lines, and each page may have the band data for 58 bands. Other possibilities may also exist.

Figure 2:
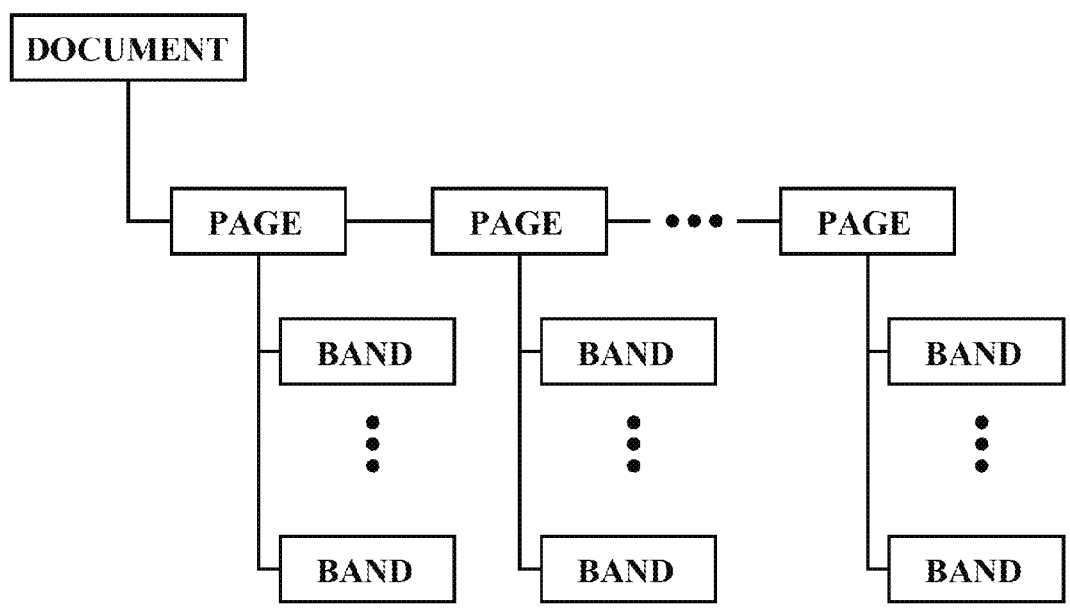
FIG. 2 shows a diagram illustrating a structure of data handled by a data processing circuit according to the first embodiment.

FIG. 2 shows a diagram illustrating a structure of data handled by the data processing circuit 11.

In some embodiments, a document may constitute at least one piece of page data. The page data may constitute a predetermined number of pieces of band data. The document may have a structure expressed by a list of nodes, the node data of the document may include a link to node data of a page, and the node data of the page may include a link to node data of a band. The node data of the band may include identification information on the band data within the page and a state of the band data. Therefore, those links enable the specified band data on the specified page within the document to be specified.

As shown in FIG. 1, in some embodiments, the image processing circuit 26 may read out the band data on the image data from the RAM 13 or the HDD 14 in accordance with the instruction transferred from the main controller 12, perform a predetermined image process (such as image expansion, image reduction, or color conversion) on the band data, and/or store the band data after the image process in the RAM 13 or the HDD 14. The image processing circuit 26 may include a DMA controller.

In some embodiments, the raster processing circuit 27 may read out the band data on the image data from the RAM 13 or the HDD 14, and performs rasterization on those pieces of band data read out to generate raster data. The raster data may be stored in the HDD 14 on the band-to-band basis, and may be read out onto the RAM 13 when a halftone process is performed.

In some embodiments, the halftone processing circuit 28 may read out the raster data from the RAM 13 on the band-to-band basis, perform the halftone process, and/or store the data after the halftone process in the RAM 13.

In some embodiments, the data output circuit 29 may read out the data after the halftone process from the RAM 13, and supply the print engine control circuit 16 with the data.

In some embodiments, the data processing circuit 11, the image data transferred from the scanner 15 may be subjected to image process such as rotation or expansion/reduction as needed. After that, the print image data may be generated through halftoning and/or output to the print engine control circuit 16. Via the data process, the RAM 13 may be used for data buffering on the band-to-band basis, and the HDD 14 may be used for data buffering on the page-to-page basis.

Figure 3:
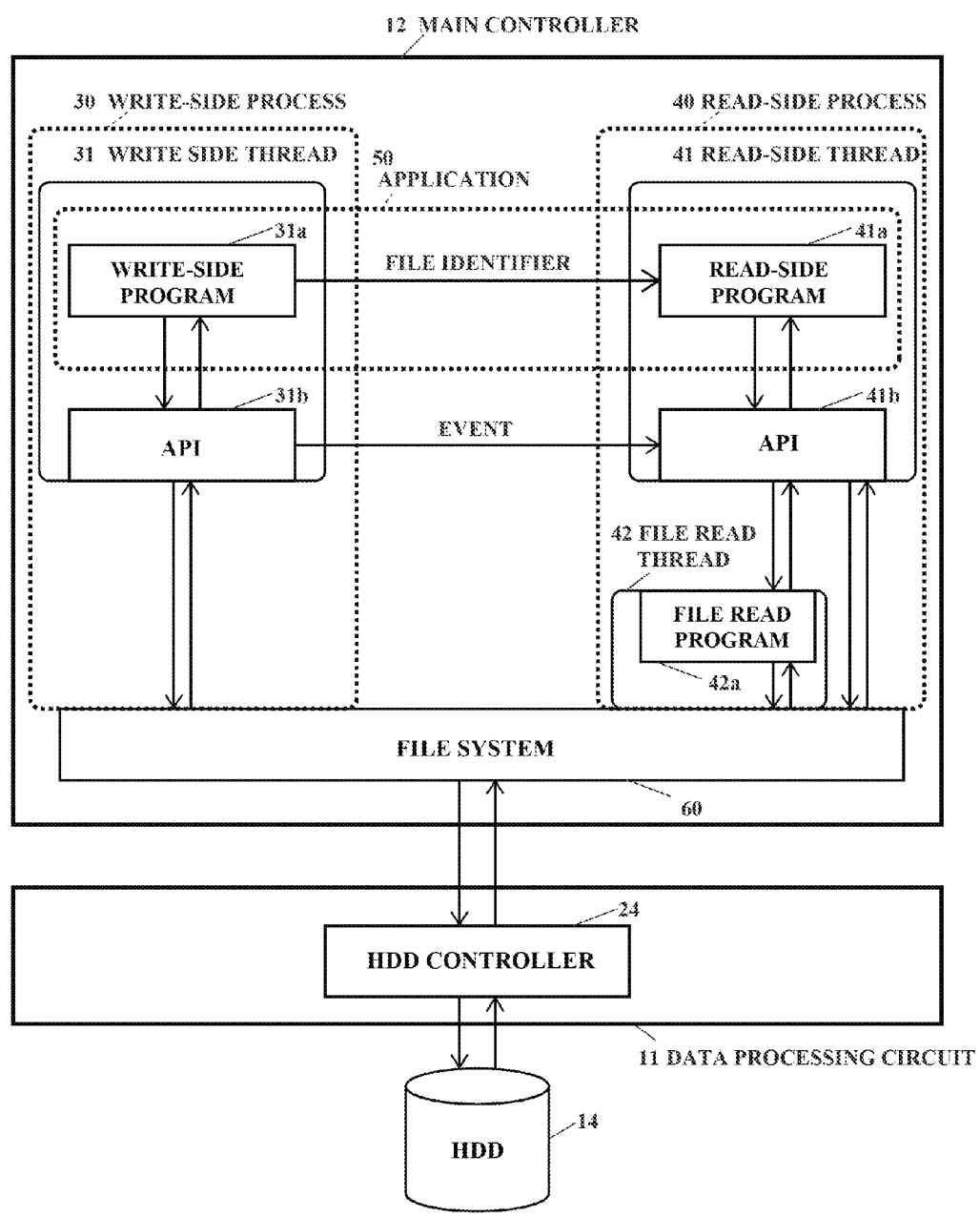
FIG. 3 shows a block diagram illustrating a configuration of a main controller according to the first embodiment.

FIG. 3 shows a block diagram illustrating a program configuration of the main controller 12.

In some embodiments, the main controller 12, an operating system that supports multiprocessing and multithreading may begin running. The main controller 12 may perform the data processing program 18 illustrated in FIG. 1, and generate a write-side process 30 and a read-side process 40. The main controller 12 may cause the write-side process 30 and the read-side process 40 to perform an application 50 for buffering data in the HDD 14. A write-side program 31a within the application 50 may be performed in a write-side thread 31 within the write-side process 30. The main controller 12 may perform the write-side program 31a to enable the HDD controller 24 to write the band data to the HDD 14. Meanwhile, a read-side program 41a within the application 50 may be performed in a read-side thread 41 within the read-side process 40. The main controller 12 may perform the read-side program 41a to enable the HDD controller 24 to read out the band data from the HDD 14.

In some embodiments, the main controller 12 may generate a file read thread 42 within the read-side process 40, and perform a file read program 42a for reading out the band data from a file, which may be included in a shared library, in the file read thread 42.

Figure 4:
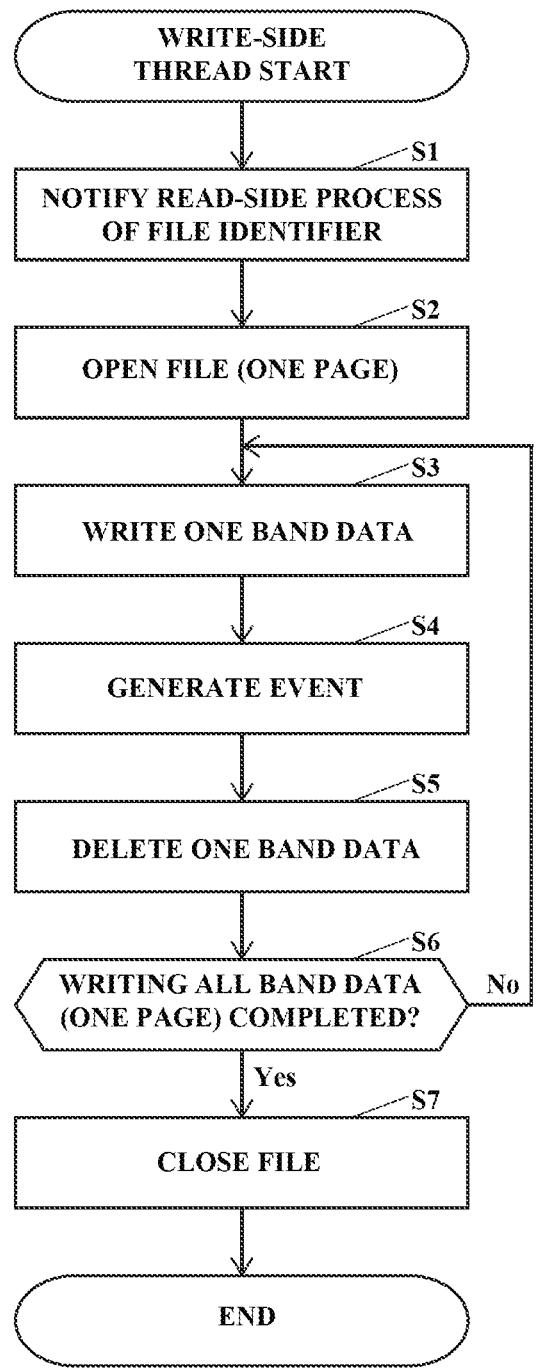
FIG. 4 shows a flowchart of an operation of a write-side process according to the first embodiment.

Next, a description may be made of operations for writing and reading data to/from the HDD 14 performed by the image forming apparatus 10. FIG. 4 shows a flowchart of an operation of the write-side process 30.

In some embodiments, the main controller 12 may perform the write-side program 31a in the write-side thread 31 to notify the read-side program 41a of the read-side process 40 of a file identifier of the file serving as a write destination of the band data (Step S1). The file identifier may include, for example, a file name. The main controller 12 may call the shared library of a file system 60 via an application program interface (API) 31b in accordance with the write-side program 31a, and open the file corresponding to the file identifier to generate a file handle (Step S2).

In some embodiments, after the file is opened, the main controller 12 may call the API 31b of the file system 60 by the write-side program 31a in the write-side thread 31, and control the HDD controller 24 to write the band data to the file within the HDD 14 (Step S3). The main controller 12 may read out the band data from the RAM 13 via DMA transfer. The HDD controller 24 may write the band data read out from the RAM 13 to the HDD 14. When the writing of one piece of band data is completed, the main controller 12 may generate an event via the API 31b (Step S4). The main controller 12 may delete the band data, the writing of which has been completed from the RAM 13 in accordance with the write-side program 31a in the write-side thread 31 (Step S5).

In some embodiments, the plurality of pieces of band data for one page may be sequentially written. When all the pieces of band data for one page is written (Step S6), the main controller 12 may call the shared library of the file system 60 via the API 31b in accordance with the write-side program 31a, and close the file corresponding to the file identifier (Step S7).

Figure 5:
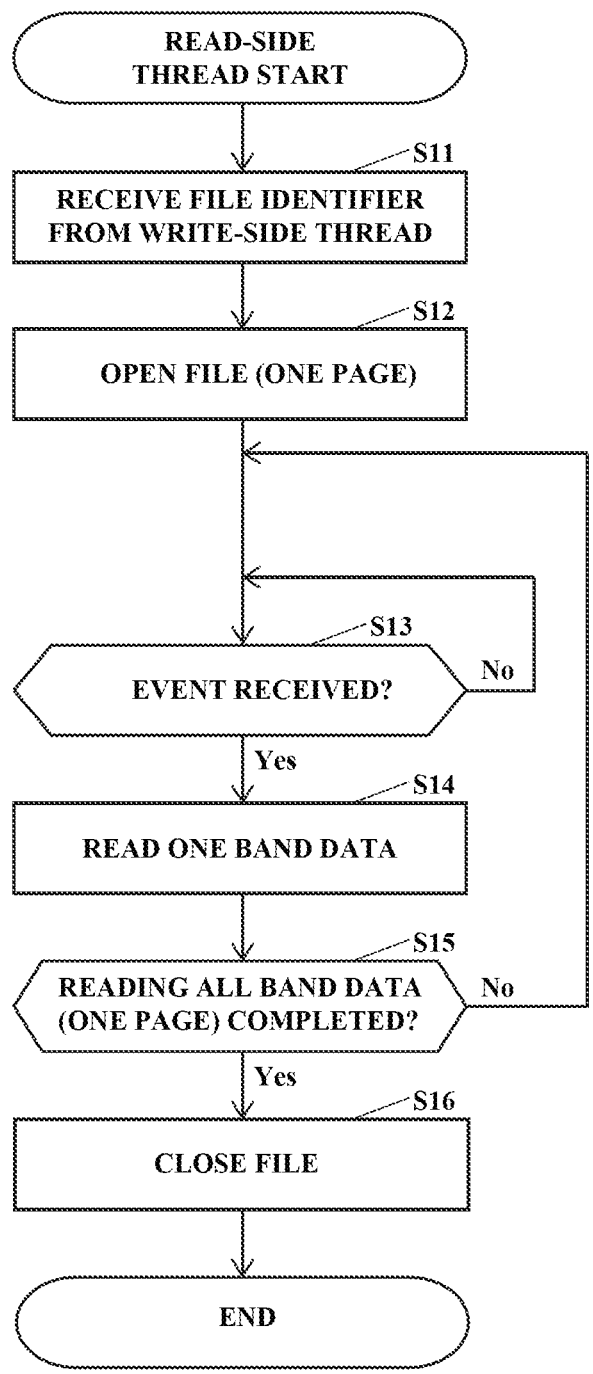
FIG. 5 shows a flowchart of an operation of a read-side process according to the first embodiment.

FIG. 5 shows a flowchart of an operation of the read-side process 40.

In some embodiments, the main controller 12 may perform the read-side program 41a in the read-side thread 41. The read-side program 41a may operate asynchronously with the write-side program 31a. When receiving the file identifier from the write-side thread 31 in accordance with the read-side program 41a in the read-side thread 41 (Step S11), the main controller 12 may open the file corresponding to the file identifier to generate a file handle (Step S12).

In some embodiments, after the file is opened, the main controller 12 may stand by until the event is received in accordance with the read-side program 41a in the read-side thread 41 (Step S13). When receiving the event from the write-side process 30, the main controller 12 may call an API 41b of the file system 60 in accordance with the read-side program 41a in the read-side thread 41, and control the HDD controller 24 to read out one piece of band data from the file within the HDD 14 (Step S14). The HDD controller 24 may read out the band data from the HDD 14. The main controller 12 writes the band data read out from the HDD 14 to the RAM 13 via the DMA transfer.

In some embodiments, for every event generated from the write-side process 30, the band data may be read out sequentially piece by piece. When the reading of all the pieces of band data for the one page is completed (Step S15), the main controller 12 may call the shared library of the file system 60 via the API 41b in accordance with the read-side program 41a in the read-side thread 41, and may close the file corresponding to the file identifier (Step S16). The HDD controller 24 may delete the closed file from the HDD 14.

Figure 6:
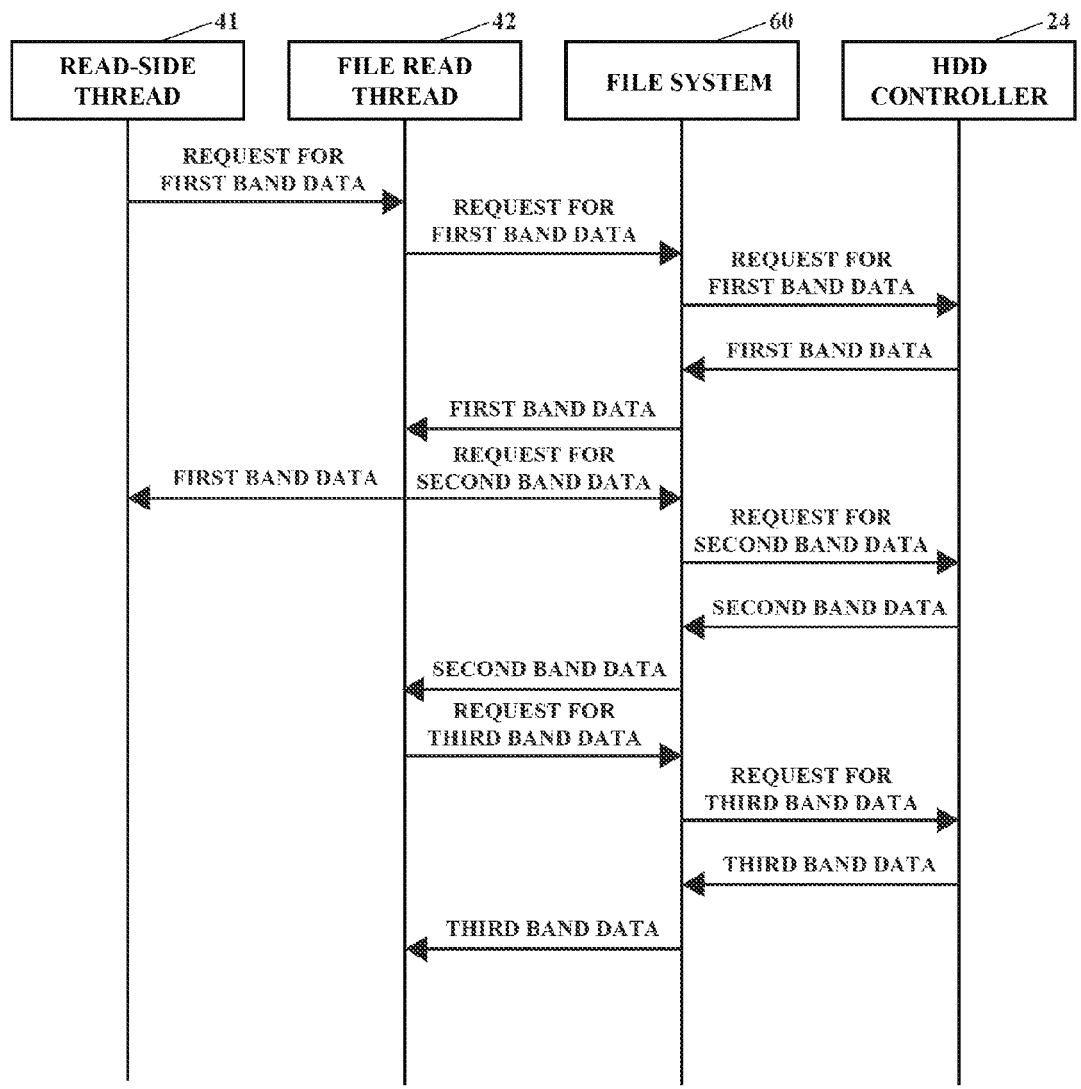
FIG. 6 shows a sequence diagram illustrating a flow of an operation of a file read thread according to the first embodiment.
Figure 7:
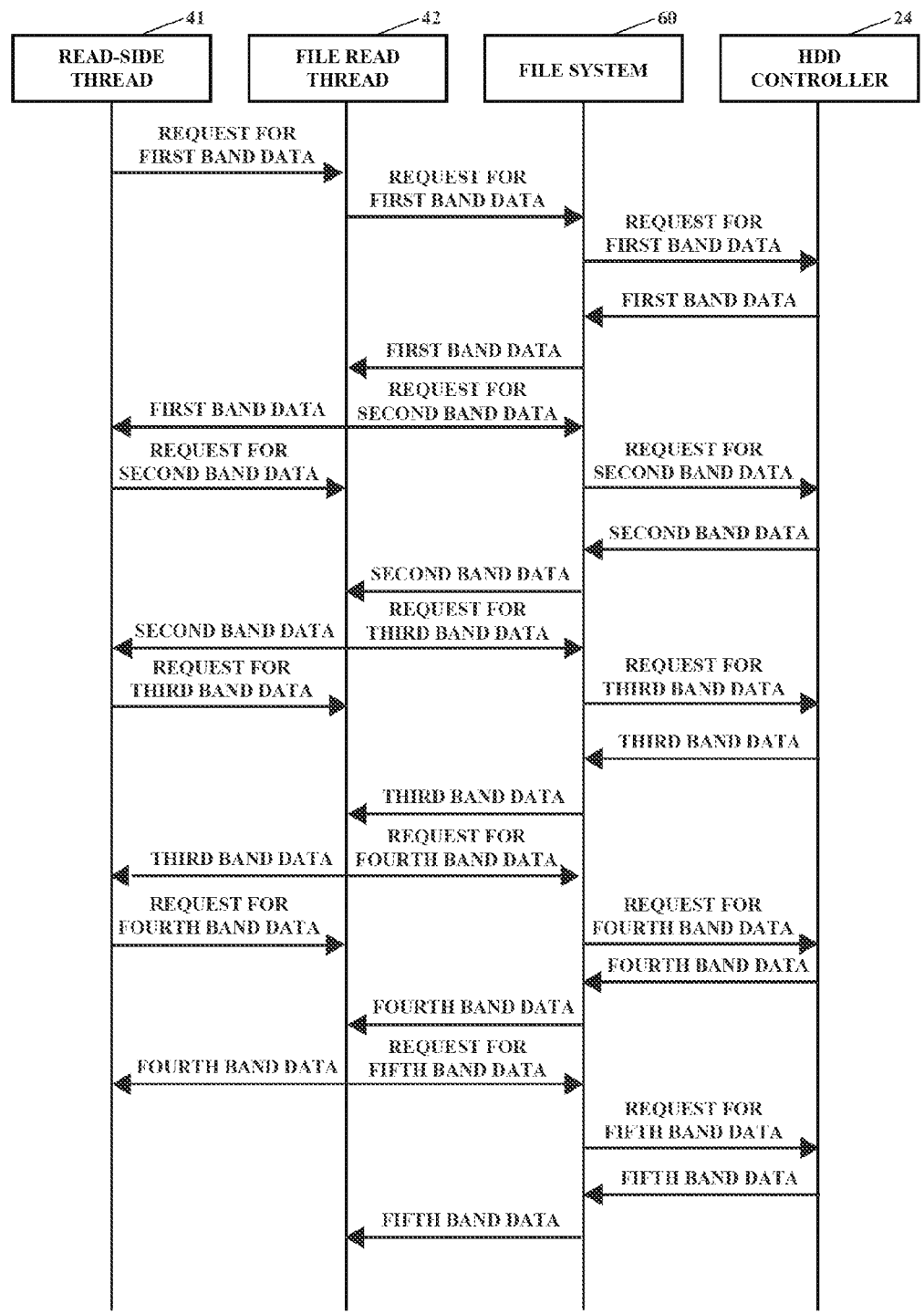
FIG. 7 shows a sequence diagram illustrating a flow of the operation of the read-side process according to the first embodiment.

FIG. 6 shows a sequence diagram illustrating a flow of an operation of the file read thread 42. FIG. 7 shows a sequence diagram illustrating a flow of the operation of the read-side process 40 in FIG. 3.

In some embodiments, the file read thread 42 may cause the HDD controller 24 to read out the band data for the two bands subsequent to the previously read out band data, possibly when the reading of which has been requested by the read-side thread 41, and perhaps causing the RAM 13 to store the band data. That is, when the reading of the band data for the first band is requested by the read-side thread 41, as shown in FIG. 6, the file read thread 42 may request the file system 60 to sequentially read out not only the band data for the first band, but also the band data for the two bands subsequent to the band data for the first band. In particular, the band data for the second band and third band may be requested irrespective of whether the reading of the band data for the second band and/or the subsequent bands have been requested by the read-side thread 41. Subsequently, when the reading of the band data for the second band is requested by the read-side thread 41, the file read thread 42 may request the file system 60 to sequentially read out not only the band data for the second band, but also the band data for the two bands subsequent to the band data for the second band. In particular, the band data for the third band and the fourth band may be requested irrespective of whether the reading of the band data for the third band and/or subsequent bands have been requested by the read-side thread 41. Thus, the requests made to the file system 60 for the reading of the band data for the second band and the reading of the band data for the third band may already be planned when the reading of the band data for the first band is requested by the read-side thread 41, and hence, the file read thread 42 may add a request to be made to the file system 60 for the reading the band data for the fourth band. When reading the band data for the third band (or the subsequent bands) is requested by the read-side thread 41, an operation may be performed by the file read thread 42. In some instances, the operation may be the same operation performed by the file read thread 42 when the reading of the band data for the second band is requested by the read-side thread 41. Note that, when the read-side thread 41 sequentially receives the band data read out by the file read thread 42, it may be stored in the RAM 13. The read-side thread 41 and the file read thread 42 may operate as described above, and hence timings of the operation of the read-side process 40 may be as illustrated in FIG. 7.

As described above, the main controller 12 according to the first embodiment (i) may generate the write-side process 30 and the read-side process 40, (ii) cause the write-side process 30 to notify the read-side process 40 of the file identifier of the file stored in the HDD 14, (iii) cause the HDD controller 24 to sequentially write the plurality of pieces of band data to the HDD 14 with the write-side process 30, and (iv) cause the HDD controller 24 to read out the plurality of pieces of band data from the file corresponding to the file identifier with the read-side process 40 when the file identifier is received in the read-side process 40. However, it should be noted that other sequences are also possible. With this configuration, before the data is written to the HDD 14, the identifier (e.g., the file identifier) of a storage area (e.g., the file) for the buffering may be transferred to the read-side process 40, and the reading of the data may be started in the read-side process 40 independently of the write-side process 30. For this reason, the image forming apparatus 10 may read out the data even while writing of the data.

Figure 8:
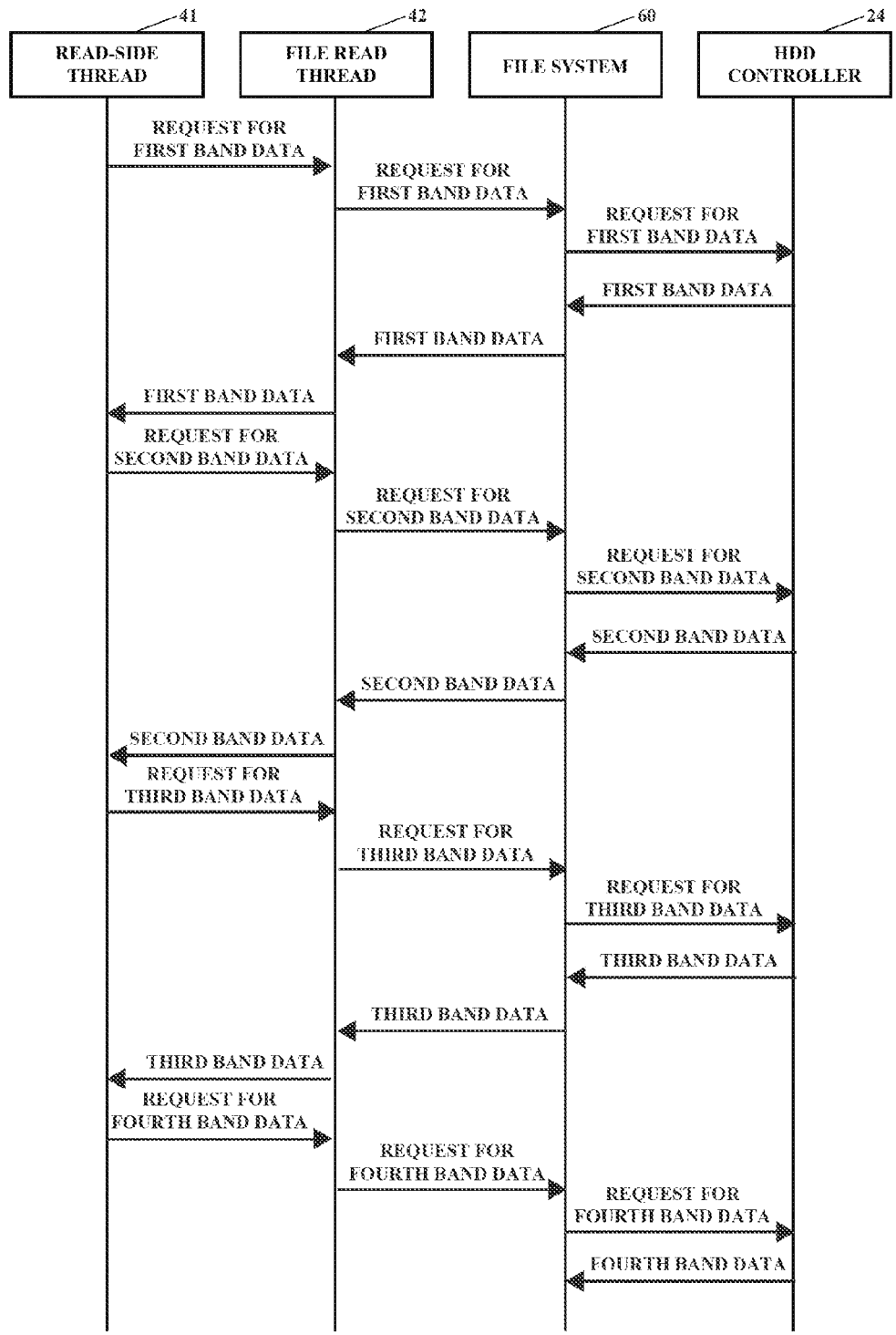
FIG. 8 shows a sequence diagram illustrating a flow of an operation of a read-side process in a case where the first embodiment is not applied.

FIG. 8 shows a sequence diagram illustrating a flow of an operation of a read-side process in a case where the first embodiment may not be applied. On the image forming apparatus 10, the file read thread 42 may cause the HDD controller 24 to read out the band data for the two bands subsequent to the band data previously read out as shown in FIG. 7. Thus, in a comparison with such a configuration may be made as shown in FIG. 8. In FIG. 8, the file read thread 42 may cause the HDD controller 24 to read out only the requested band data each time. Therefore, it is possible to increase the number of times to perform the process by causing the HDD controller 24 to read out the band data per unit in time. Accordingly, the image forming apparatus 10 may decrease the delay in the process performed after the buffering, due to the buffering of the data into the HDD 14. As such, the image forming apparatus 10 may increase the time during which the main controller 12, possibly a processor such as a CPU and perhaps the HDD controller 24 implemented as an ASIC, operate simultaneously. Therefore, the time necessary to read one page may be reduced.

Note that, in the first embodiment, the file read thread 42 may not only cause the HDD controller 24 to read out the band data for the two bands subsequent to the band data previously read out, but may also cause the band data for any number of subsequent bands to be read out.

Second Embodiment

According to a second embodiment of the present disclosure, the main controller 12 in FIG. 1 may generate a thread. In some embodiments, a program of a shared library for writing band data to the file may be operated. Further, in some embodiments, a program of the shared library for reading out the band data from the file may be operated. Further, the program may be operated separately from the write-side thread and the read-side thread in which the application 50 is operated. With this configuration, an image forming apparatus performs a process for writing the band data and a process for reading the band data asynchronously with the process of the application 50.

Note that, the image forming apparatus according to the second embodiment may have the same or similar configuration in the first embodiment.

Figure 9:
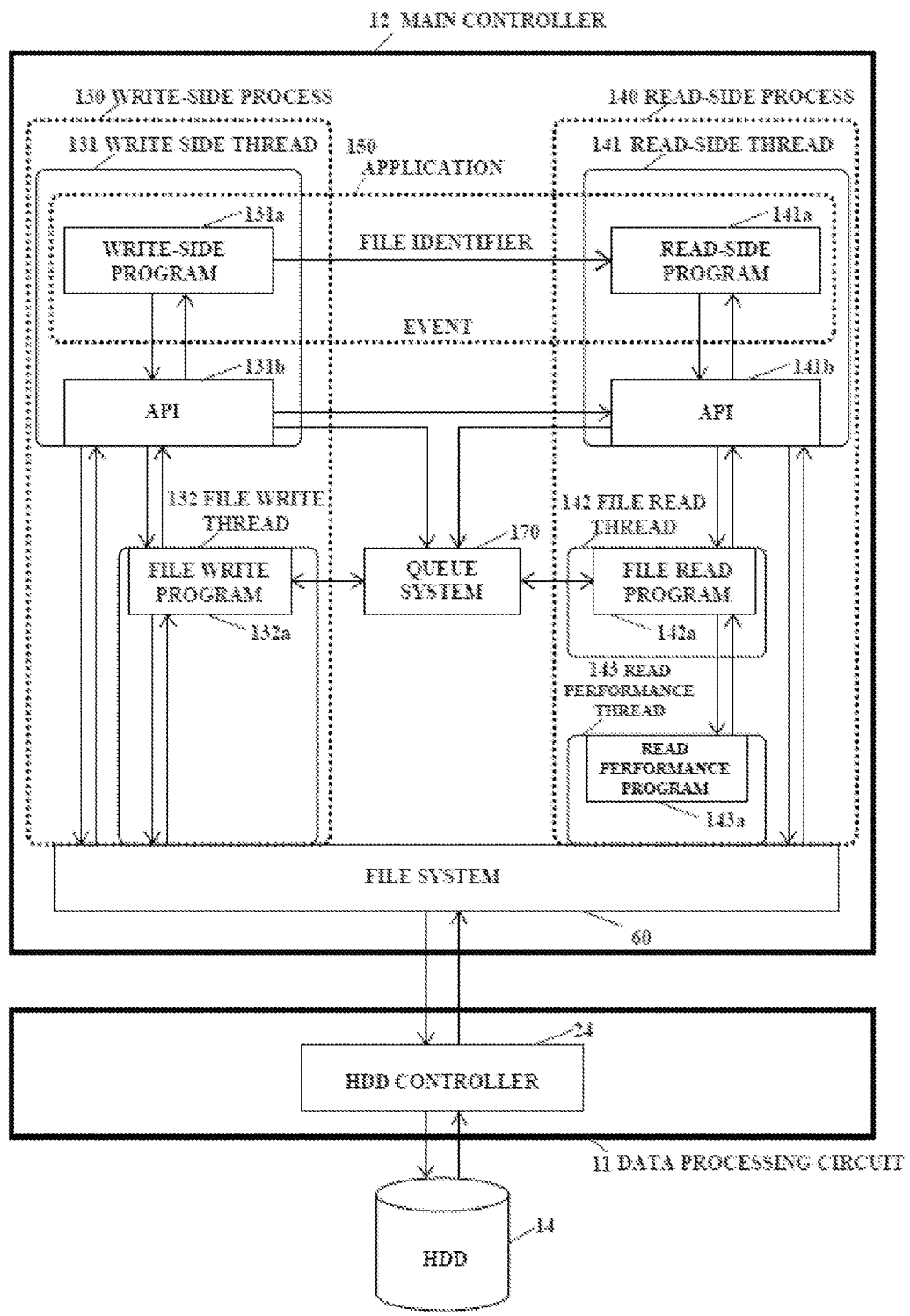
FIG. 9 shows a block diagram illustrating a configuration of a main controller of an image forming apparatus according to a second embodiment of the present disclosure.

FIG. 9 shows a block diagram illustrating a program configuration of the main controller 12, according to the second embodiment.

On the main controller 12, an operating system may run and support multiprocessing and multithreading. In some embodiments, the main controller 12 may perform the data processing program 18, and first generates a write-side process 130 and a read-side process 140. In some embodiments, the main controller 12 may use the write-side process 130 and the read-side process 140 to perform an application 150 for buffering data in the HDD 14. A write-side program 131a within the application 150 may be performed in a write-side thread 131 within the write-side process 130. The main controller 12 may perform the write-side program 131a to enable the HDD controller 24 to write the band data to the HDD 14. In addition, a read-side program 141*a* within the application 150 may be performed in a read-side thread 141 within the read-side process 140. Further, the main controller 12 may perform the read-side program 141*a* to enable the HDD controller 24 to read out the band data from the HDD 14.

In some embodiments, the main controller 12 may generate a file write thread 132 within the write-side process 130, and perform a file write program 132*a* of the shared library for writing the band data to the file in the file write thread 132. The main controller 12 may generate a file read thread 142 within the read-side process 140, and may perform a file read program 142*a* of the shared library for reading out the band data from the file in the file read thread 142. In addition, the main controller 12 may queue a write request for data and a read request for data. In some embodiments, such requests may be generated from the application 150, as access requests in a queue system 170. In some instances, such requests may initiate the file write program 132*a* and the file read program 142*a* to perform the writing and reading of the band data based on the access requests queued in the queue system 170. With such configurations, the image forming apparatus 10 may carry out the writing and reading of the band data asynchronously with the processing of the application 150.

Figure 10:
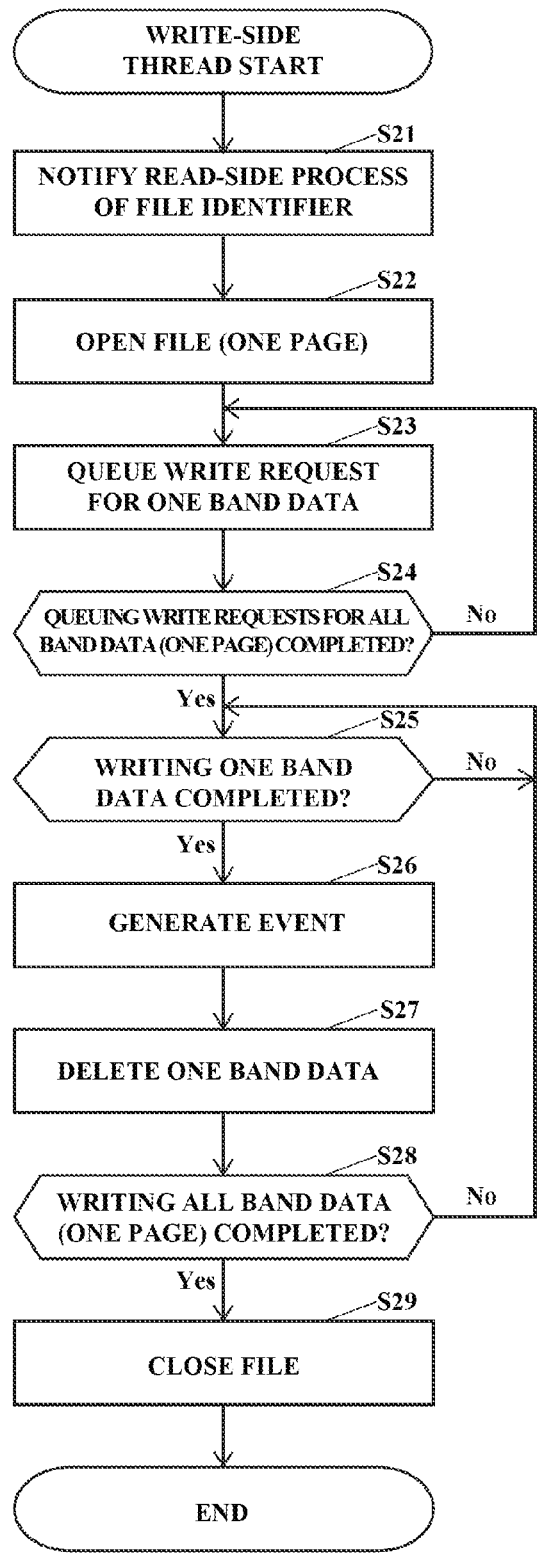
FIG. 10 shows a flowchart of an operation of a write-side thread according to the second embodiment.

FIG. 10 shows a flowchart of an operation of the write-side thread 131.

In some embodiments, the main controller 12 may perform the write-side program 131*a* in the write-side thread 131. In some instances, the write-side program 131*a* may be performed to notify the read-side program 141*a* of the read-side process 140. Further, in some instances, the read-side process 140 may correspond to the file identifier of the file serving as the write destination of the band data (Step S21). The file identifier may include, for example, the file name. In some instances, the main controller 12 may call the shared library of the file system 60 via an API 131*b* in accordance with the write-side program 131*a*. Further, the main controller may open the file corresponding to the file identifier (for one page) to generate the file handle (Step S22).

In some embodiments, after the file is opened, the main controller 12 calls the API 131*b* of the file system 60 in accordance with the write-side program 131*a* in the write-side thread 131. Further, the main controller may queue the write requests for the band data to the file corresponding to the file identifier in order of the queue system 170. In response to the write request for the data in accordance with the write-side program 131*a* (Step S23), the main controller 12 may further transfer write instructions for the respective pieces of band data to the file write thread 132. In the write instructions, pieces of identification information on the band data that are to be written are specified. In particular, identification information on the document may include the band data, identification information on the page including the band data, and identification information on the band data within the one page. The main controller 12 may repeatedly perform Step S23 until the write requests for all the pieces of band data are queued (Step S24).

Figure 11:
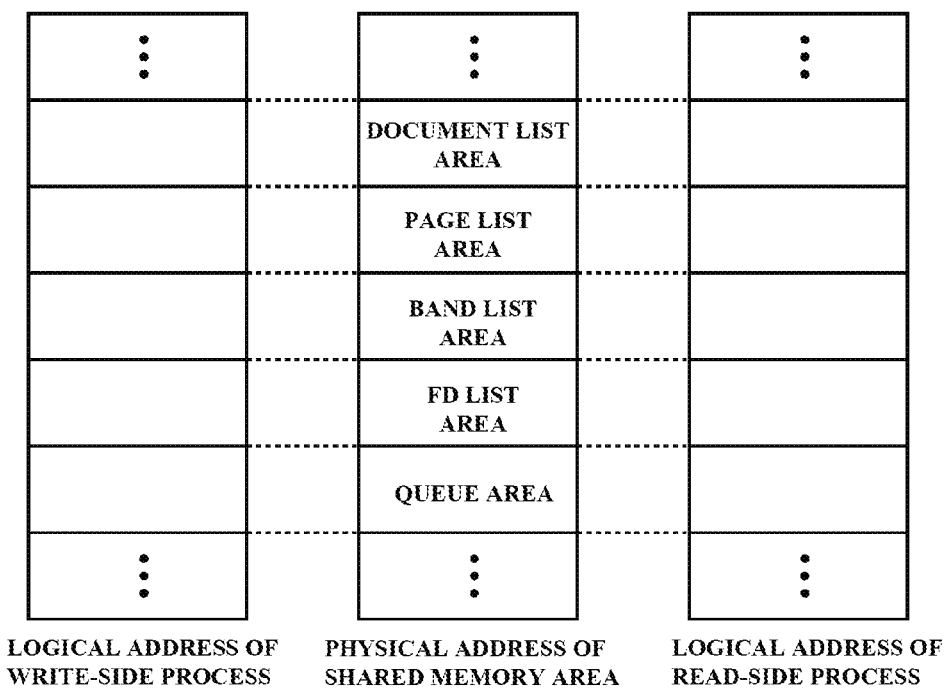
FIG. 11 shows a diagram illustrating a shared memory area within a queue system according to the second embodiment.

FIG. 11 shows a diagram illustrating a shared memory area within the queue system 170.

In some embodiments, the shared memory area may be allocated on the RAM 13, and a physical address of the RAM 13 may be mapped to logical addresses of the write-side process 130. Further, the read-side process 140 may enable the respective processes to access the shared memory area. In the queue system 170, the shared memory area may include a document list area, a page list area, a band list area, an FD list area, and/or a queue area, among other possibilities.

In the document list area, the node data of the document including the band data to be written or read out may be stored via the API 131*b* or an API 141*b*. The node data of the document may include link information to the node data of the page that may constitute the document.

In the page list area, the node data of the page including the band data to be written or read out may be stored via the API 131*b* or the API 141*b*. Further, the node data of the page may include link information to the node data of the band that constitutes the page and link information to a file descriptor.

In the band list area, the node data of the band to be written or read out may be stored via the API 131*b* or the API 141*b*. The node data of the band may include IDs and serial numbers of the document and the page to which the band belongs and, in addition, the identification information (such as serial number) on the band data within the file, among other possibilities.

In the FD list area, the file descriptor of the file corresponding to each page may be written for the each page via the API 131*b* or the API 141*b*.

In the queue area, the access request may be written for each piece of band data via the API 131*b* or the API 141*b*. The access request may include an access type (write or read) and the identification information on the subject piece of band data. Accordingly, the write request for the data and the read request for the data may coexist in one queue.

The queue system 170 may have a semaphore for exclusive control access, and may not be accessible simultaneously from more than two of the following: (i) write-side thread 131, (ii) the file write thread 132, (iii) the read-side thread 141, and/or (iv) the file read thread 142, among other possibilities.

Figure 12:
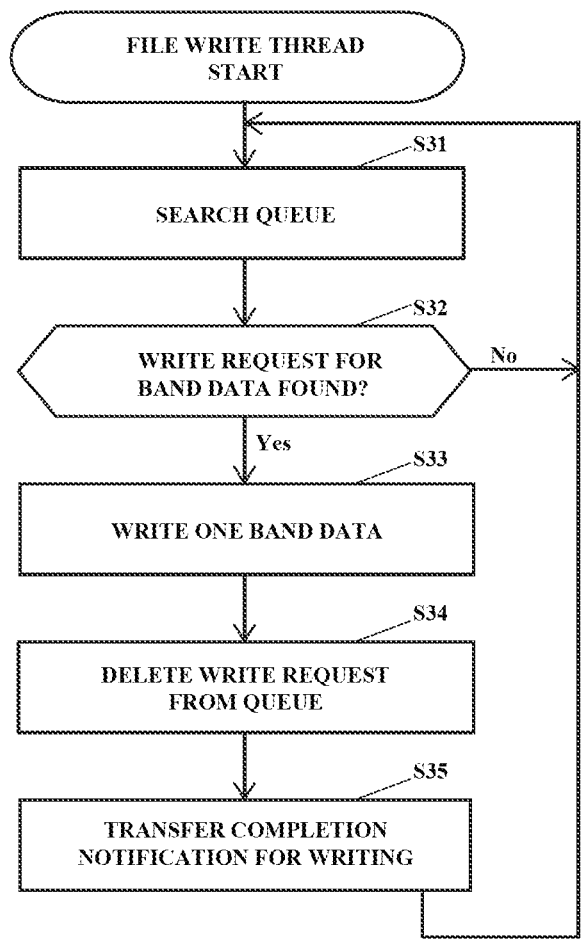
FIG. 12 shows a flowchart of an operation of a file write thread according to the second embodiment.

FIG. 12 shows a flowchart of an operation of the file write thread 132.

In some embodiments, the main controller 12 may search the queue for the access request in accordance with the file write program 132*a* in the file write thread 132 (Step S31). When the main controller 12 finds the write request for the band data within the queue (Step S32), the main controller 12 may specify the band data and the write destination that are specified by the write request from structure data and the file descriptor that are written in the queue system 170. The main controller 12 may read out the band data from the RAM 13 via the DMA transfer in the file write thread 132. The HDD controller 24 may write the read out band data to the specified write destination (Step S33).

When writing of one piece of band data is completed, the main controller 12 may delete the write request for the band data from the queue in accordance with the file write program 132*a* in the file write thread 132 (Step S34), and may transfer a completion notification for the writing of the band data to the API 131*b* (Step S35).

In this manner, the queued access request for the writing may be processed asynchronously by performing the file write program 132*a* of the file write thread 132 separate from the application 150.

When the completion notification for the writing of the data to the API 131*b* is transferred, the main controller 12 may generate an event via the API 131*b* (Step S26), as shown in FIG. 10. The main controller 12 may delete the band data from the RAM 13 in accordance with the write-side program 131*a* in the write-side thread 131 (Step S27).

When the writing of all the pieces of band data for the one page is completed (Step S28), the main controller 12 may call the shared library of the file system 60 via the API 131*b* in accordance with the write-side program 131*a*, and may close the file corresponding to the file identifier (Step S29).

Figure 13:
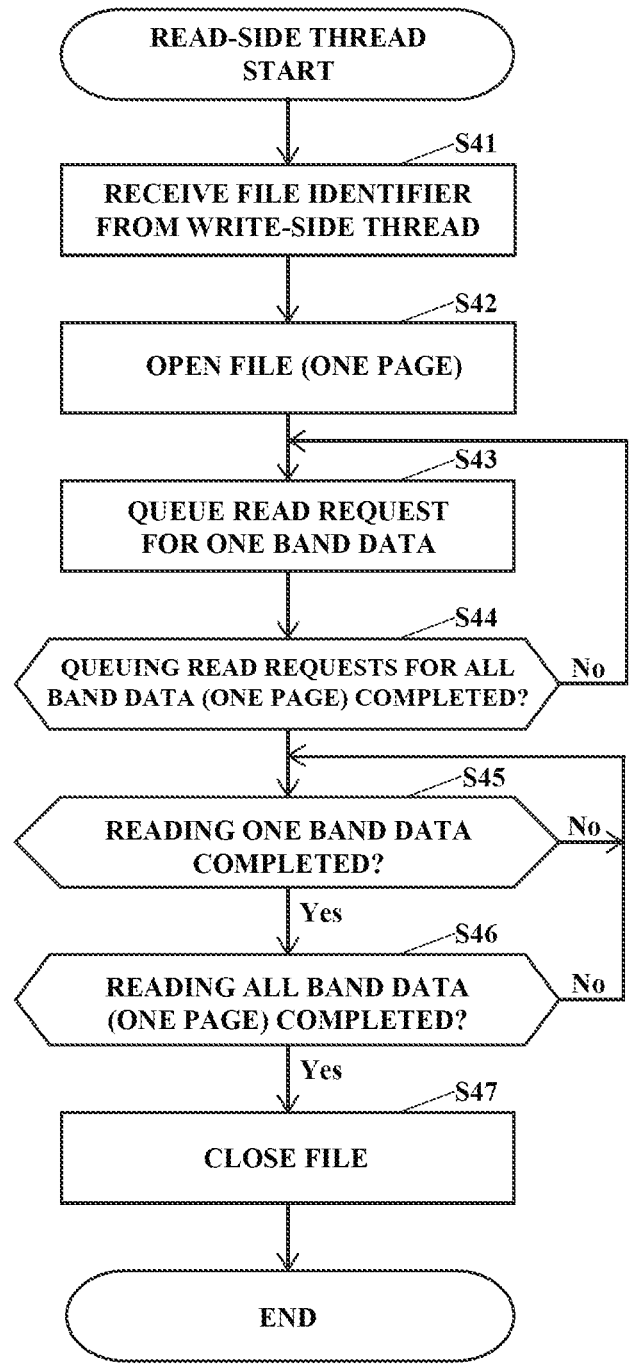
FIG. 13 shows a flowchart of an operation of a read-side thread according to the second embodiment.

FIG. 13 shows a flowchart of an operation of the read-side thread 141.

The main controller 12 may perform the read-side program 141a in the read-side thread 141. The read-side program 141a may operate asynchronously with the write-side program 131a. When receiving the file identifier from the write-side thread 131 in accordance with the read-side program 141a in the read-side thread 141 (Step S41), the main controller 12 may open the file corresponding to the file identifier (for one page) to generate a file handle (Step S42).

After the file is opened, the main controller 12 may call the API 141b of the file system 60 in accordance with the read-side program 141a in the read-side thread 141, and may queue the read requests for the respective pieces of band data from the file corresponding to the file identifier in order in the queue system 170. In some embodiments, the main controller 12 may transfer read instructions for the respective pieces of band data to the file read thread 142 in response to the read request for the data, in accordance with the read-side program 141a (Step S43). In the read instruction, pieces of identification information on the band data to be read out are specified. In particular, such specifications may include identification information on the document including the band data, identification information on the page including the band data, and/or identification information on the band data within the one page, among other possibilities as well. The main controller 12 may repeatedly perform process of Step S43 until the read requests for all the pieces of band data are queued (Step S44).

Figure 14:
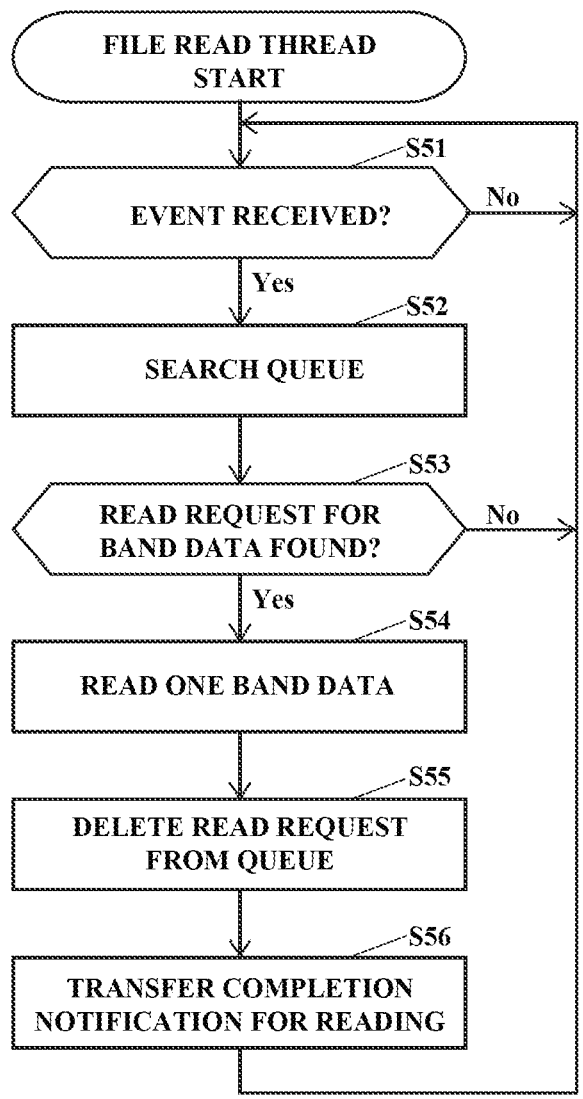
FIG. 14 shows flowchart of an operation of a file read thread according to the second embodiment.

FIG. 14 shows a flowchart of an operation of the file read thread 142.

When the main controller 12 receives an event in the file read thread 142 at the time the writing of the band data is completed (Step S51), the main controller 12 may search the queue for the read request in accordance with the file read program 142a (Step S52). When the main controller 12 finds the access request for the band data within the queue (Step S53), the main controller 12 may call the API 141b of the file system 60, and may control the HDD controller 24 to read out the band data from the file within the HDD 14 (Step S54). As such, the band data specified by the read request and a read source may be specified from the structure data and the file descriptor that are written in the queue system 170. The HDD controller 24 may read out the band data from the specified read source. The main controller 12 may write the read out band data via the DMA transfer to the RAM 13 in accordance with the file read program 142a.

When one piece of band data is read, the main controller 12 may delete the read request for the band data from the queue in accordance with the file read program 142a in the file read thread 142 (Step S55). Further, the main controller 12 may transfer a completion notification for the reading of the band data to the API 141b (Step S56).

As such, for every event generated from the write-side process 130, the band data may be read out sequentially piece by piece.

Then, as shown in FIG. 13, the main controller 12 may determine whether the reading of all the pieces of band data for the one page is completed for each completion notification associated with the read-side program 141a in the read-side thread 141 (Step S46). When the reading of all the pieces of band data for the one page is completed, the main controller 12 may call the shared library of the file system 60 via the API 141b, and may close the file corresponding to the file identifier (Step S47). As such, the HDD controller 24 may delete the closed file from the HDD 14.

Figure 15:
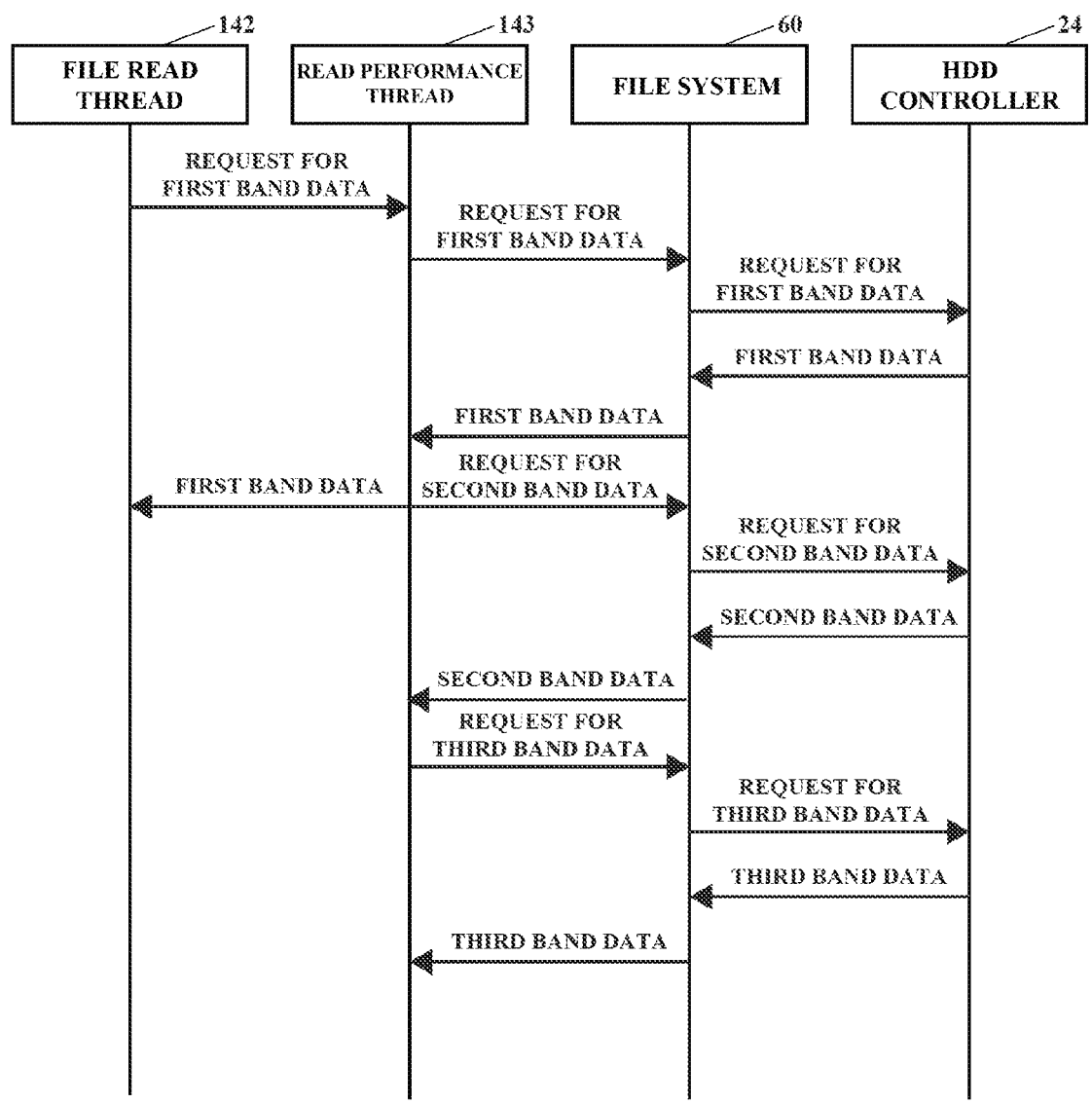
FIG. 15 shows sequence diagram illustrating a flow of the operation of the read performance thread according to the second embodiment.
Figure 16:
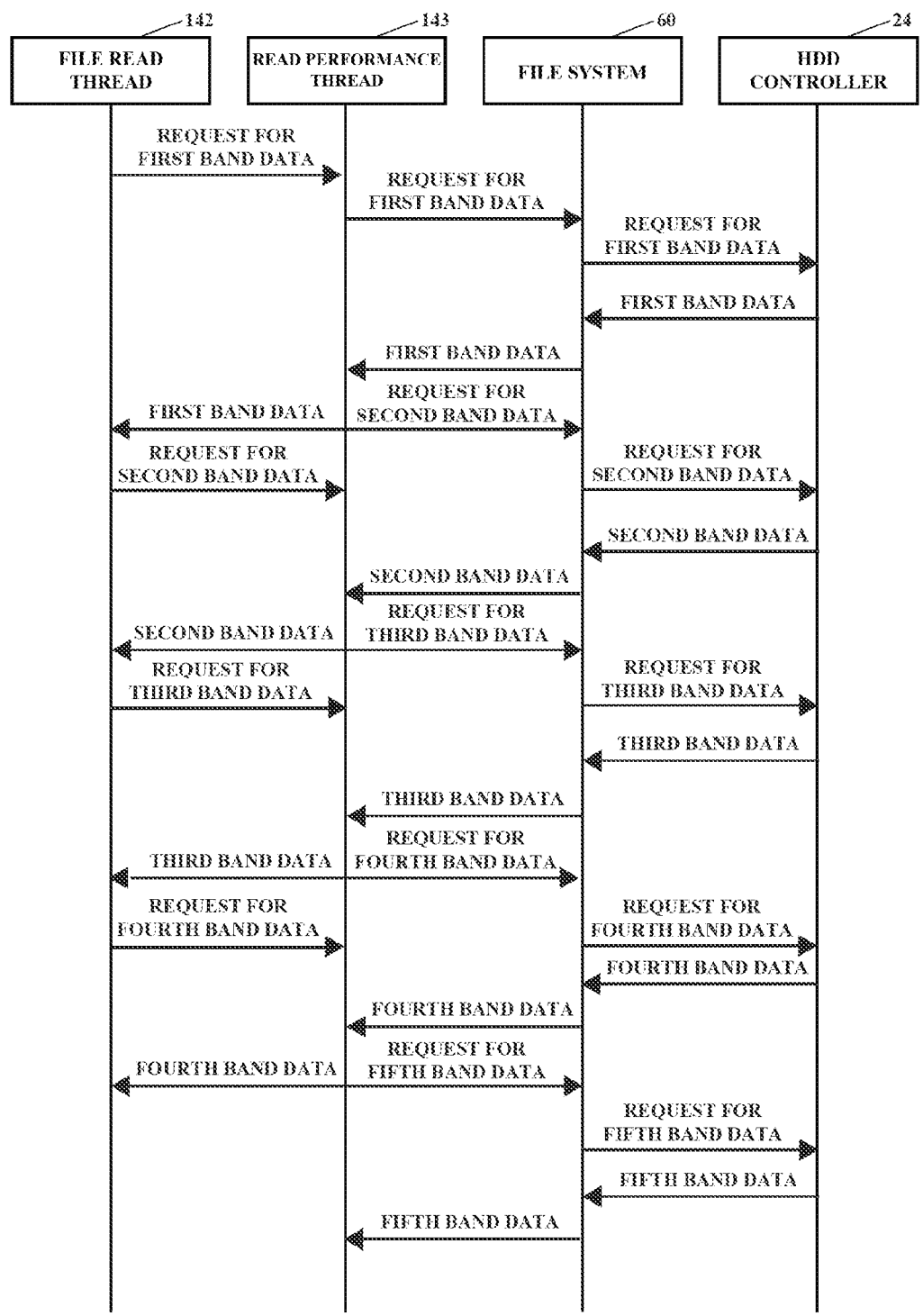
FIG. 16 shows a sequence diagram illustrating a flow of an operation of a read-side process according to the second embodiment.

FIG. 15 shows a sequence diagram illustrating a flow of an operation of the read performance thread 143. FIG. 16 shows a sequence diagram illustrating a flow of an operation of the read-side process 140.

In some embodiments, the read performance thread 143 may cause the HDD controller 24 to read out the band data for the two bands subsequent to the previous band data. In some instances, the reading may have been requested by the file read thread 142 and may cause the RAM 13 to store the same. In particular, the reading of the band data for the first band may be requested by the file read thread 142, as shown in FIG. 15. Further, read performance thread 143 may not only request the file system 60 to sequentially read out the band data for the first band, but it may also request to read out the band data for the two bands subsequent to the band data for the first band. As such, the band data for the second band and the third band may be requested, irrespective of whether the reading of the band data for the second band or the subsequent bands have been requested by the file read thread 142. Subsequently, when the reading of the band data for the second band is requested by the file read thread 142, read performance thread 143 may request the file system 60 to sequentially read the band data for the second band. Further, it may also request to sequentially read out the band data for the two bands subsequent to the band data for the second band. As such, the band data for the third band and the fourth band are requested irrespective of whether the reading of the band data for the third band or the subsequent bands have been requested by the file read thread 142. Further, the requests made to the file system 60 for the reading of the band data for the second band and the third band may already be planned. Further, such requests may be planned when the reading of the band data for the first band is requested by the file read thread 142. Therefore, the read performance thread 143 may add a request to be made to the file system 60 for the reading of the band data for the fourth band. In some embodiments, when the reading of the band data for the third band or the subsequent bands is requested by the file read thread 142, an operation performed by the read performance thread 143 may be the same as the operation performed by the read performance thread 143 when the reading of the band data for the second band is requested by the file read thread 142. It should be noted that the file read thread 142 sequentially receives the band data read out by the read performance thread 143 and stored in the RAM 13. The file read thread 142 and the read performance thread 143 may operate as described above, and hence timings of the operation of the read-side process 40 are as shown in FIG. 16.

As described above, the main controller 12 according to the second embodiment (i) may generate the write-side thread 131 and the file write thread 132 by the write-side process 130, (ii) generate the read-side thread 141 and the file read thread 142 by the read-side process 140, (iii) cause the write-side thread 131 to notify the read-side thread 141 of the identifier of the file stored in the HDD 14 and then sequentially queue the write requests for each of the plurality of pieces of band data in the write-side thread 131, (iv) cause the HDD controller 24 to write the plurality of pieces of band data with the file write thread 132 in order of the queued write requests, (v) sequentially queue the read requests for each of the plurality of pieces of band data when the file identifier of the file is received by the read-side thread 141, and/or (vi) cause the HDD controller 24 to read out the plurality of pieces of band data with the file read thread 142 in order of the queued read requests, among other possibilities. With this configuration, the file write program 132a that performs the writing to the HDD 14 may operate in the file write thread 132 that is a separate thread from the write-side thread 131. Further, asynchronous writing may be performed, which enables the write-side program 131a to perform another processing without waiting for the completion of the data writing. Further, the file read program 142a that performs the reading from the HDD 14 may operate in the file read thread 142 that is a separate thread from the read-side thread 141, and hence the asynchronous reading may be performed, which enables the read-side program 141a to perform another processing without waiting for the completion of the data reading. Accordingly, some embodiments may decrease the delay in the process performed after the buffering due to the buffering of the data into the HDD 14.

Figure 17:
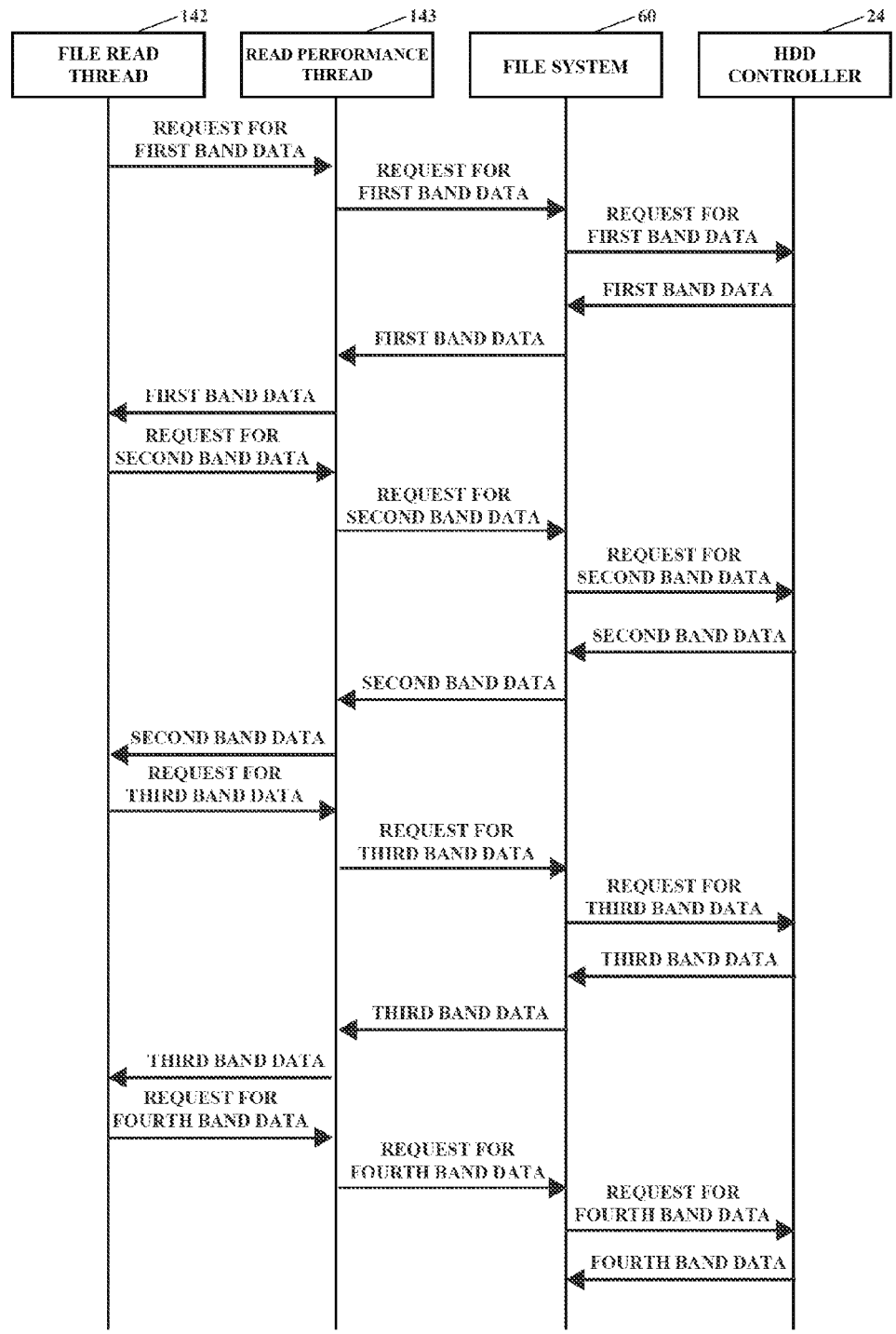
FIG. 17 shows a sequence diagram illustrating a flow of an operation of a read-side process in a case where the second embodiment is not applied.

FIG. 17 shows a sequence diagram illustrating a flow of an operation of a read-side process in a case where the second embodiment is not applied. Accordingly to the second embodiment, the read performance thread 143 may cause the HDD controller 24 to previously read out the band data for the two bands subsequent to the band data as shown in FIG. 16. Further, in comparison with such a configuration as shown in FIG. 17, the read performance thread 143 may cause the HDD controller 24 to read out only the requested band data each time the reading of the band data is requested by the file read thread 142. Further, it is possible to increase the number of times to execute the process for causing the HDD controller 24 to read out the band data per unit time. Accordingly, regarding the second embodiment, the delay in the process performed may be decreased after the buffering of the data into the HDD 14. As such, the image forming apparatus according to the second embodiment may increase the time during which the main controller 12 being a processor such as a CPU and the HDD controller 24 implemented as an ASIC may operate simultaneously, and may therefore reduce the time necessary to read one page.

Note that, in the second embodiment, the read performance thread 143 may cause the HDD controller 24 to previously read out the band data for the two bands subsequent to the band data, but may cause the band data for any number of bands to be read out.

Third Embodiment

According to a third embodiment of the present disclosure, the write-side thread 131 may generate an event at a time when the queuing of the write requests for the band data is completed. The file read thread 142 may read out the band data from the RAM 13 when the band data exists on the RAM 13, and may read out the band data from the file stored in the HDD 14 when the band data does not exist on the RAM 13.

Note that, the image forming apparatus according to the third embodiment has the same or similar configuration in the first embodiment.

In addition, note that the image forming apparatus according to the third embodiment has the same or similar program configuration in the second embodiment.

Hereinafter, a description is made of an operation of the main controller 12 according to the third embodiment.

Note that, the file write thread 132 and the read-side thread 141 may perform the same or similar operations in the second embodiment.

Figure 18:
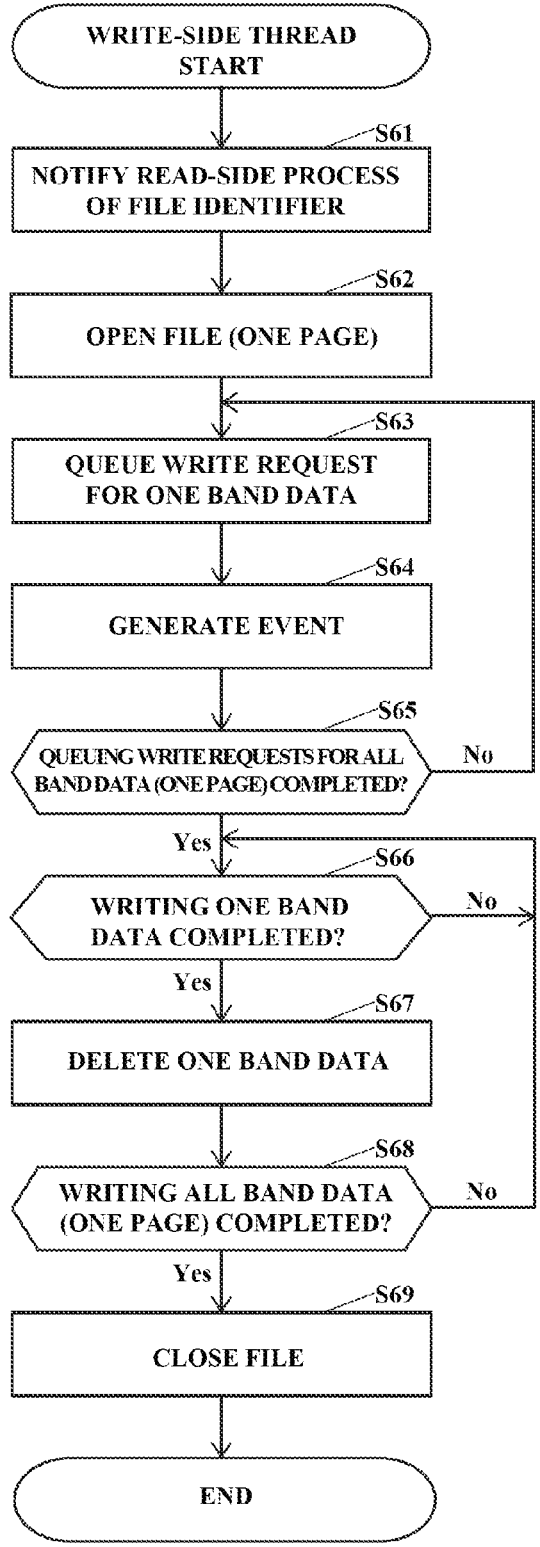
FIG. 18 shows a flowchart of an operation of a write-side thread of an image forming apparatus according to a third embodiment of the present disclosure.

FIG. 18 shows a flowchart of an operation of the write-side thread 131 according to the third embodiment.

Unlike in the second embodiment, the write-side thread 131 according to the third embodiment generates the event not when the writing of the band data is completed (YES in Step S66) but each time the queuing of a write request for the band data (Step S63) is finished (Step S64).

Figure 19:
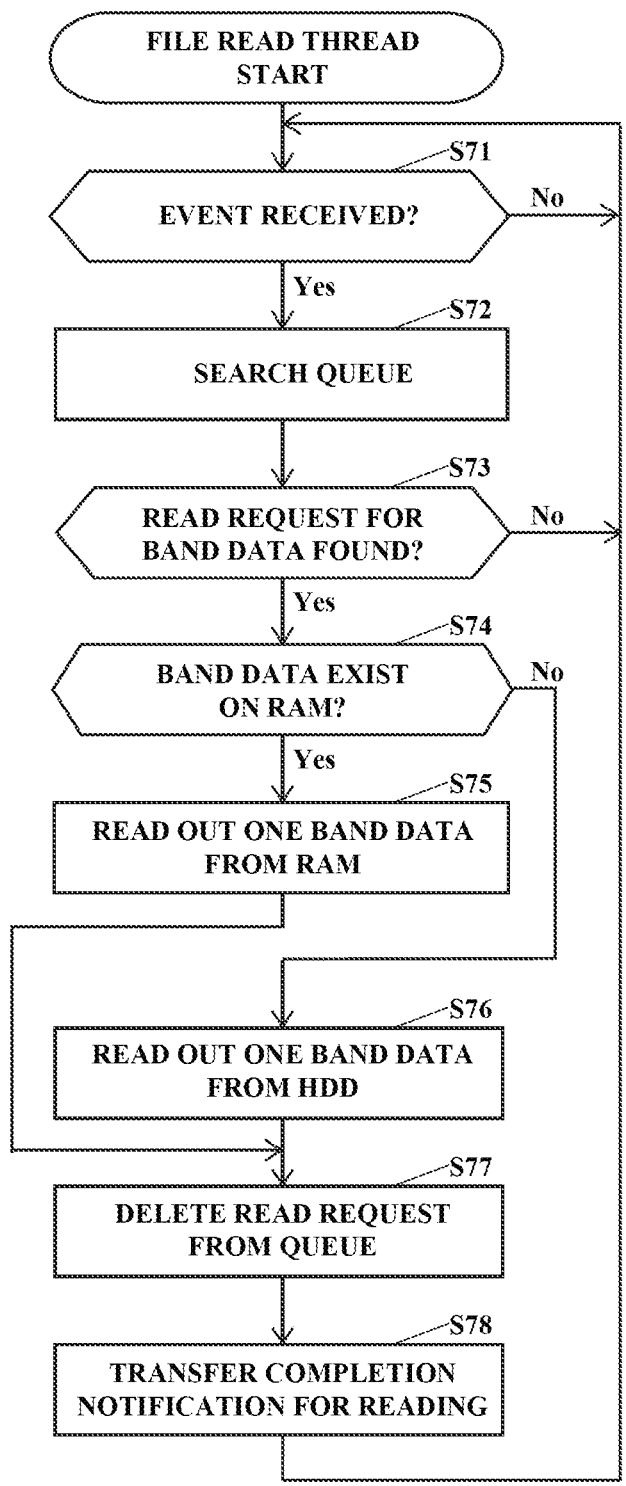
FIG. 19 shows a flowchart of an operation of a file read thread according to the third embodiment.

FIG. 19 shows a flowchart of an operation of the file read thread 142 according to the third embodiment.

Unlike in the second embodiment, when the access request is found in the queue (YES in Step S73), the file read thread 142 according to the third embodiment may determine whether the band data to be read out exists on the RAM 13 (Step S74). As a result, if the band data to be read out exists on the RAM 13, the file read thread 142 may read out the band data from the RAM 13 in accordance with the file read program 142a (Step S75). If the band data to be read out does not exist on the RAM 13, the file read thread 142 may control the HDD controller 24 to read out the band data from the file stored in the HDD 14 in accordance with the file read program 142a. At this time, the HDD controller 24 may read out the band data from the HDD 14 (Step S76).

Figure 20:
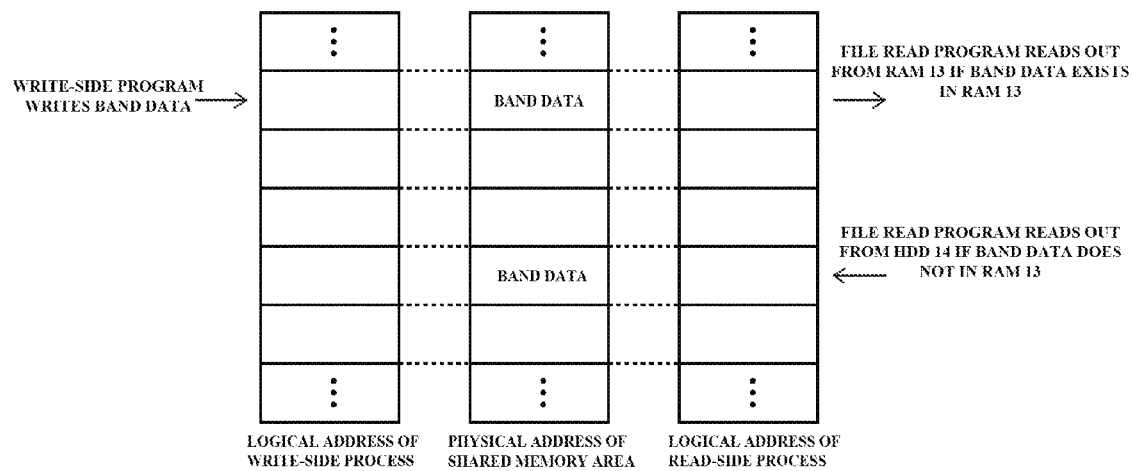
FIG. 20 shows a diagram illustrating a method of reading band data from a RAM of the image forming apparatus according to the third embodiment.

FIG. 20 shows a diagram illustrating a method of reading the band data from the RAM 13 according to the third embodiment.

In some embodiments, the band data may be stored in a predetermined shared memory area within the RAM 13. The physical address of the shared memory area may be mapped to the logical addresses of the respective processes, in other words, the write-side process 130 and the read-side process 140. The access to the shared memory area may be made from the respective threads of the write-side process 130 and the read-side process 140, in other words, the write-side thread 131, the file write thread 132, the read-side thread 141, and/or the file read thread 142, among other possibilities.

As described above, the main controller 12 according to the third embodiment (i) may store one piece of band data in the RAM 13 in the write-side process 130, (ii) generate an event at each time a write request for one piece of band data is queued in the write-side thread 131, (iii) delete the band data from the RAM 13 in the read-side thread 141 when the writing of the band data to the HDD 14 is completed, (iv) when the queued read requests for the data are performed sequentially, if the band data to be read out exists in the RAM 13, with the file read thread 142, read out the band data from the RAM 13 without reading out the band data from the HDD 14, and (v) if the band data does not exist in the RAM 13, cause the HDD controller 24 to read out the band data from the HDD 14.

With this configuration, if the band data exists in the RAM 13, it is possible to immediately use the band data on the RAM 13. For this reason, it is possible to read out the data in a shorter period of time than to read out the data from the HDD 14, which may decrease the delay at the time when the data is read out.

The present disclosure of the embodiment includes various other embodiments. For example, other designs may be used in which the above-described components are each present.

For example, in the third embodiment, when the writing of the band data to the HDD 14 is completed in the write-side process 13 while the band data is being read out from the RAM 13 in the read-side thread 141, the main controller 12 may delete the band data from the RAM 13 in the write-side thread 131 after the reading of the band data is completed in the read-side thread 141. For example, such process may be performed with exclusive control of access to the storage area for the band data.

In the first, second, and third embodiments, the data may be compressed before the data is written to the HDD 14, and the data may be expanded after the data is read out from the HDD 14. Examples of a compression/expansion scheme that may be used include a Joint Photographic Experts Group (JPEG) scheme and a run length encoding (RLE) scheme.

In the first, second, and third embodiments, the file handle may be used as the file identifier of which the read-side process is notified by the write-side process.

In the first, second, and third embodiments, the file system 60 is used to read and write the data from/to the HDD 14, but the file system 60 may not necessarily be provided. In that case, identification information such as address and size on the storage area on the HDD 14 that stores the band data for one page may be used instead of the file identifier.

In the first, second, and third embodiments, the application for the write-side process and the application for the read-side process may be provided as separate programs independent of each other.

In the first, second, and third embodiments, the HDD 14 may be used as the storage device, but a storage device using a semiconductor memory such as a solid state drive (SSD) may be used.

In the first, second, and third embodiments, one write-side process and one read-side process are provided, but a plurality of similar processes may be generated on both the write-side and the read-side. Also in that case, one queue system 170 according to the second embodiment and the third embodiment suffices.

In the first, second, and third embodiments, the single main controller 12 may perform both the write-side process and the read-side process, but a processor including a plurality of processing elements may be used to perform the write-side process and the read-side process separately.

In the first, second, and third embodiments, the image data divided into the band data may be processed, but the present disclosure may be applied to the image forming apparatus that divides data of another type into blocks having a predetermined size, and may perform a process for each of the blocks.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
  a storage controller configured to: (i) write image data on one page to a storage device, wherein the image data comprises a plurality of pieces of band data and (ii) to read out the plurality of pieces of band data from the storage device; and
  a processor configured to control the storage controller, wherein the processor is configured to:
  (a) generate a write-side process that causes the storage controller to write the plurality of pieces of band data;
  (b) generate a read-side process that causes the storage controller to read out the plurality of pieces of band data;
  (c) generate a write-side thread and a file write thread by the write-side process;
  (d) generate a read-side thread and a file read thread by the read-side process;
  (e) based on the write-side process, store one piece of band data in a memory;
  (f) based on the write-side thread, generate an event at each time a write request for one piece of band data is queued in a queue system;
  (g) based on the read-side process and the read-side thread, delete each of the plurality of pieces of band data from the memory when writing the each of the plurality of pieces of band data to the storage device is completed; and
  (h) based on sequentially performing queued read requests for the plurality of pieces of band data, if one of the plurality of pieces of band data to be read out exists on the memory, cause the storage controller to read out the one of the plurality of pieces of band data, and wherein if none of the plurality of pieces of band data exists in the memory, cause the storage controller to read out each of the plurality of pieces of band data from the storage device,
  (i) based on reading of one of the plurality of pieces of band data requested by the read-side thread, cause the storage controller to read out the one of the plurality of pieces of band data, and wherein one or more of the plurality of pieces of band data is subsequent to the one of the plurality of pieces of band data.

2. The image forming apparatus according to claim 1, wherein the plurality of pieces of band data are written to a file stored in the storage device, and wherein an identifier of the storage area includes an identifier of the file.

3. The image forming apparatus according to claim 1, wherein the storage device includes a buffer that temporarily stores the image data based on the image process performed on the image data.

4. The image forming apparatus according to claim 1, wherein the queue system includes a shared memory area allocated onto a memory, and wherein a physical address of the shared memory area is mapped to logical addresses of the write-side process and the read-side process to cause the write-side process and the read-side process to access the shared memory area.

* * * * *